US009906917B2

(12) United States Patent  
Zhang et al.

(10) Patent No.: US 9,906,917 B2  
(45) Date of Patent: Feb. 27, 2018

(54) GENERATING AN INDOOR MAP FOR A STRUCTURE USING DATA GATHERED BY A USER DEVICE

(71) Applicant: Verizon Patent and Licensing Inc., Arlington, VA (US)

(72) Inventors: Yueping Zhang, Princeton, NJ (US); Oleg L. Berzin, Huntingdon Valley, PA (US); Chris M. Okoniewski, Florence, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2 days.

(21) Appl. No.: 15/168,928

(22) Filed: May 31, 2016

(65) Prior Publication Data

US 2017/0347244 A1 Nov. 30, 2017

(51) Int. Cl.
*H04W 4/04* (2009.01)
*H04W 4/02* (2009.01)
*H04L 29/08* (2006.01)

(52) U.S. Cl.
CPC ............. *H04W 4/04* (2013.01); *H04L 67/22* (2013.01); *H04W 4/026* (2013.01); *H04W 4/027* (2013.01)

(58) Field of Classification Search
CPC ....... H04W 4/04; H04W 4/026; H04W 4/027; H04L 67/22
See application file for complete search history.

(56) References Cited

U.S. PATENT DOCUMENTS

| 2013/0273940 | A1* | 10/2013 | Park | G01C 21/20 |
| | | | | 455/456.2 |
| 2014/0088860 | A1* | 3/2014 | Poornachandran | G01C 21/16 |
| | | | | 701/410 |
| 2014/0278060 | A1* | 9/2014 | Kordari | G01C 21/206 |
| | | | | 701/422 |
| 2015/0156611 | A1* | 6/2015 | Aggarwal | H04W 4/04 |
| | | | | 455/456.1 |
| 2016/0192140 | A1* | 6/2016 | Park | H04W 40/244 |
| | | | | 455/456.3 |
| 2016/0261987 | A1* | 9/2016 | Jovicic | G01C 21/206 |
| 2016/0349349 | A1* | 12/2016 | Patwari | G01S 5/0252 |

OTHER PUBLICATIONS

Wikipedia, "Location-based service," https://en.wikipedia.org/wiki/Location-based_service#Comparison_of_location_tracking_apps_for_mobile_device, Apr. 28, 2016, 11 pages.

(Continued)

*Primary Examiner* — Brandon J Miller

(57) ABSTRACT

A first device may receive data from one or more sensors associated with the first device. The data may indicate movements of the first device. The first device may be associated with a user. The first device may determine a state of the user indicated by the movements of the first device. The first device may determine whether the data is associated with the movements of the user inside one or more structures. The first device may generate a map for a structure, of the one or more structures, by combining the data received from the one or more sensors. The first device may provide the map for the structure for display and the data toward one or more second devices.

20 Claims, 9 Drawing Sheets

(56) References Cited

OTHER PUBLICATIONS

Indoor LBS "Target and Retailers Using Hybrid Indoor Location Tech to Enable New Customer Experiences," http://www.indoorlbs.com/new-blog-1/, Nov. 30, 2015, 5 pages.

O'Brien, "Where's the Next Big Business Opportunity? Turn to Location-Based Services," http://insights.wired.com/profiles/blogs/discovering-new-business-opportunities-with-location-based#axzz3wbIPStuV, Nov. 14, 2014, 6 pages.

Gahran, "Who's Using Mobile Maps and Check-Ins—and who's not?," http://www.cnn.com/2012/05/15/tech/mobile/pew-survey-location-based/index.html, May 15, 2012, 3 pages.

Lee et al., "Step Detection Robust Against the Dynamics of Smartphones," http://www.mdpi.com/1424-8220/15/10/27230, Oct. 26, 2015, 21 pages.

Brajdic et al., "Walk Detection and Step Counting on Unconstrained Smartphones," dl.acm.org/citation.cfm?id=2493449, Sep. 2013, 10 pages.

Indoor Atlas, "What is Indoor Positioning Systems (IPS)," www.indooratlas.com. Mar. 2, 2016, 15 pages.

\* cited by examiner

GENERATING AN INDOOR MAP FOR A STRUCTURE USING DATA GATHERED BY A USER DEVICE

BACKGROUND

Location-based services are computer program-level services that use location data to control features. Location-based services may use information on the geographical position of a user device to provide a service to the user device. For example, location-based services may include services that enable a user to identify a location of a person or an object. As another example, location-based services may include turn-by-turn navigation or location-based advertising. Location-based services may be accessible via a mobile network using a user device (e.g., a smartphone or a tablet).

DETAILED DESCRIPTION OF PREFERRED EMBODIMENTS

The following detailed description of example implementations refers to the accompanying drawings. The same reference numbers in different drawings may identify the same or similar elements.

Providing location-based services to indoor user devices (e.g., user devices inside a structure, such as a retail store, an airport, or a stadium) may present challenges. For example, indoor maps may not exist, may be inaccurate, or may be unavailable to the indoor user device, thereby preventing a service provider from providing location-based services to the indoor user device. As another example, providing location-based services to an indoor user device may be hindered because of decreased performance, such as decreased performance of sub-meter accuracy, of global positioning systems (GPS) or other location-based technologies when the indoor user device is inside the structure.

To address these challenges, several techniques have been developed to provide location-based services to an indoor user device (e.g., indoor GPS or differential GPS (dGPS)). However, these techniques may use beacons installed inside the structure to communicate with the indoor user device (e.g., by using visible light communication, Bluetooth low energy (BLE) signals, millimeter wave signals, or acoustic signals). By using beacons to provide location-based services to the indoor user device, these techniques depend on installation of a particular quantity or density of beacons, which may be difficult and/or costly. In addition, these techniques may depend on installation of wiring, power supply, network access points, or other infrastructure to support the beacons, which may be difficult and/or costly. Further, beacons may depend on line-of-sight communication to provide location-based services, which may be difficult to achieve inside a structure and may result in reduced performance of providing location-based services to an indoor user device.

Implementations described herein enable an edge device to generate an indoor map for a structure based on data gathered by an indoor user device. In this way, the edge device may enable a service provider to provide location-based services to the indoor user device using the indoor map and without depending on additional infrastructure (e.g., beacons) located inside the structure, thereby improving the providing of location-based services to the indoor user device.

Figure 1A:
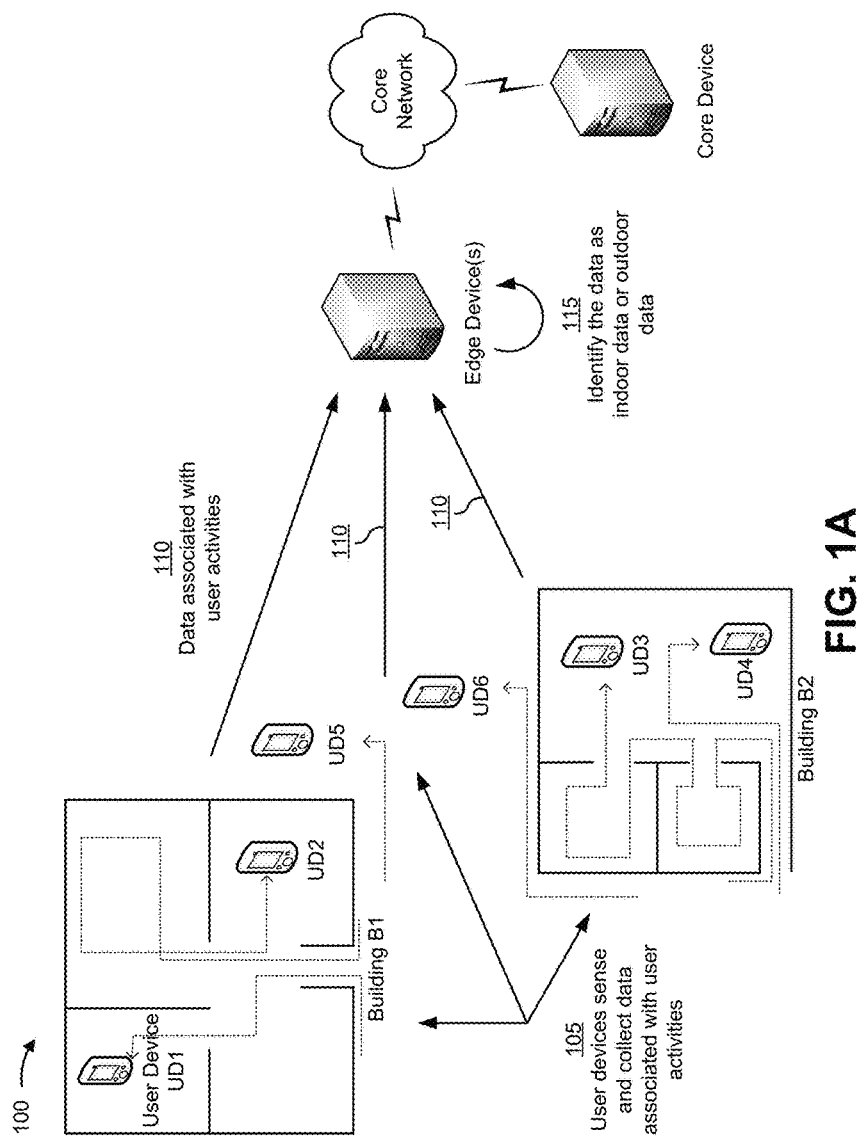
FIGS. 1A-1E are diagrams of an overview of an example implementation described herein.

FIGS. 1A-1E are diagrams of an overview of an example implementation 100 described herein. As shown in FIG. 1A, one or more user devices may be in communication with one or more edge device(s) (e.g., servers, data centers, or workstations). The user devices may include indoor user devices associated with users located inside a building (e.g., shown as user devices UD1 and UD2 located inside building B1 and user devices UD3 and UD4 located inside building B2). In addition, the user devices may include outdoor user devices associated with users located outside a building (e.g., shown as user device UD5 located outside building B1 and user device UD6 located outside building B2). FIG. 1A shows a floor plan for buildings B1 and B2.

As shown by reference number 105, the user devices may sense and gather data associated with user activities. For example, the user devices may use an accelerometer, a barometer, a global positioning system (GPS), a gyroscope, a magnetometer, a pedometer, and/or another type of sensor that senses and gathers data as a user of the user device moves about (e.g., walks, turns, or changes levels inside a building or outside a building). As shown by reference number 110, the user devices may transmit the data sensed and gathered by the user devices to the edge device(s). For example, the user devices may transmit data associated with activities of the users, such as data that indicates steps, turns, directions of travel, distance traveled, and/or altitude changes of the users.

As shown by reference number 115, the edge device(s) may identify the data from the user devices as indoor data from indoor user devices or outdoor data from outdoor user devices. For example, the edge device(s) may identify the data as indoor data or outdoor data based on states of the users indicated by the data, whether the data indicates that the user is in the same location as a known building (e.g., buildings B1 or B2), or other information indicated by the data. The edge device(s) may identify the data from user devices UD1 through UD4 as indoor data based on user devices UD1 through UD4 being located inside buildings B1 and B2. Additionally, the edge device(s) may identify the data from user devices UD5 and UD6 as outdoor data based on user devices UD5 and UD6 being located outside of buildings B1 and B2.

Figure 1B:
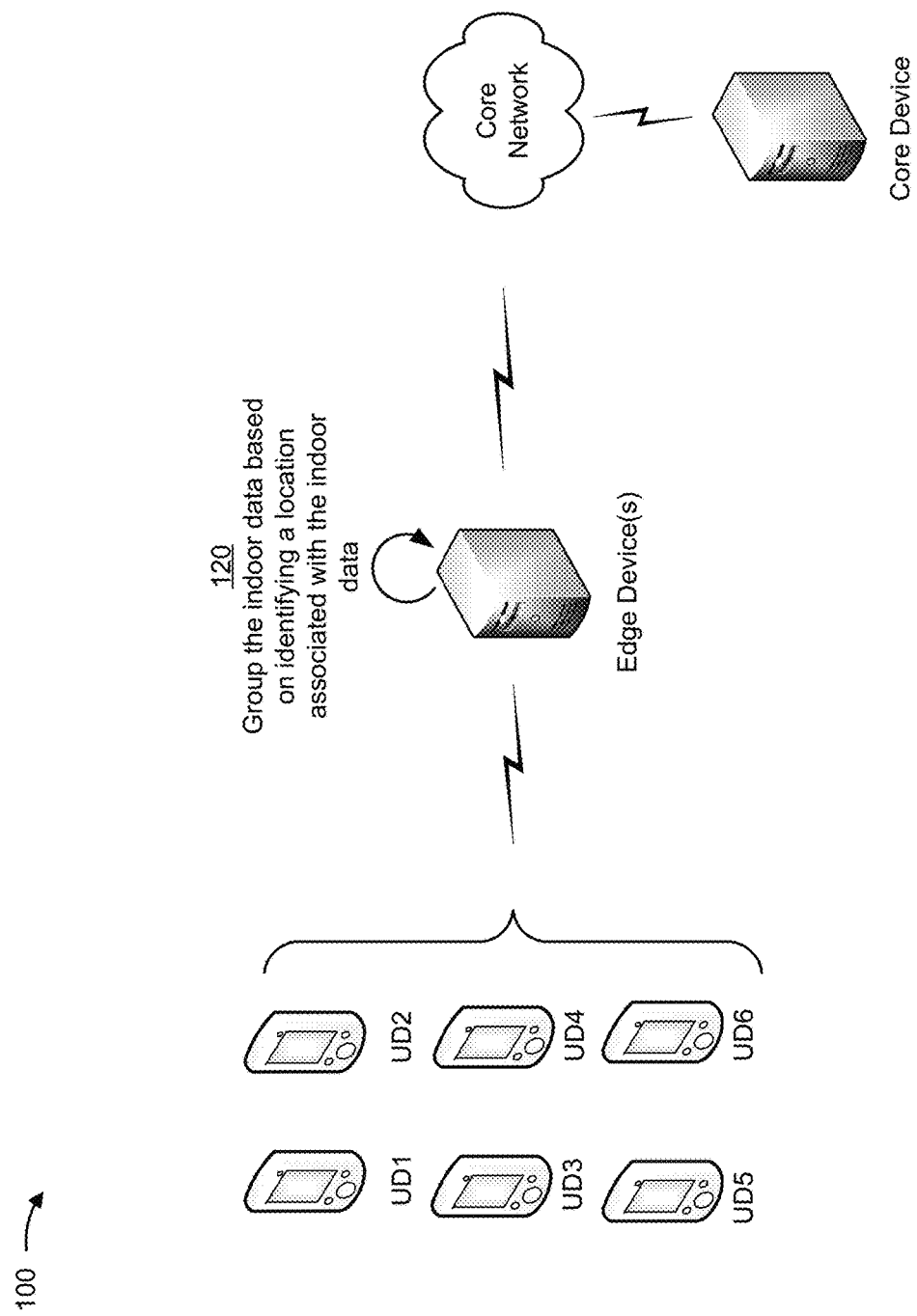

As shown in FIG. 1B, and by reference number 120, the edge device(s) may group the indoor data based on identifying a location associated with the indoor data. The edge device(s) may group the indoor data from user devices UD1 and UD2 based on determining that user devices UD1 and UD2 are located inside building B1. Additionally, the edge device(s) may group the indoor data from user devices UD3 and UD4 based on determining that user devices UD3 and UD4 are located inside building B2. Further, the edge device(s) may ignore and/or discard the outdoor data from user devices UD5 and UD6 based on the outdoor data being located outside buildings B1 and B2.

Figure 1C:
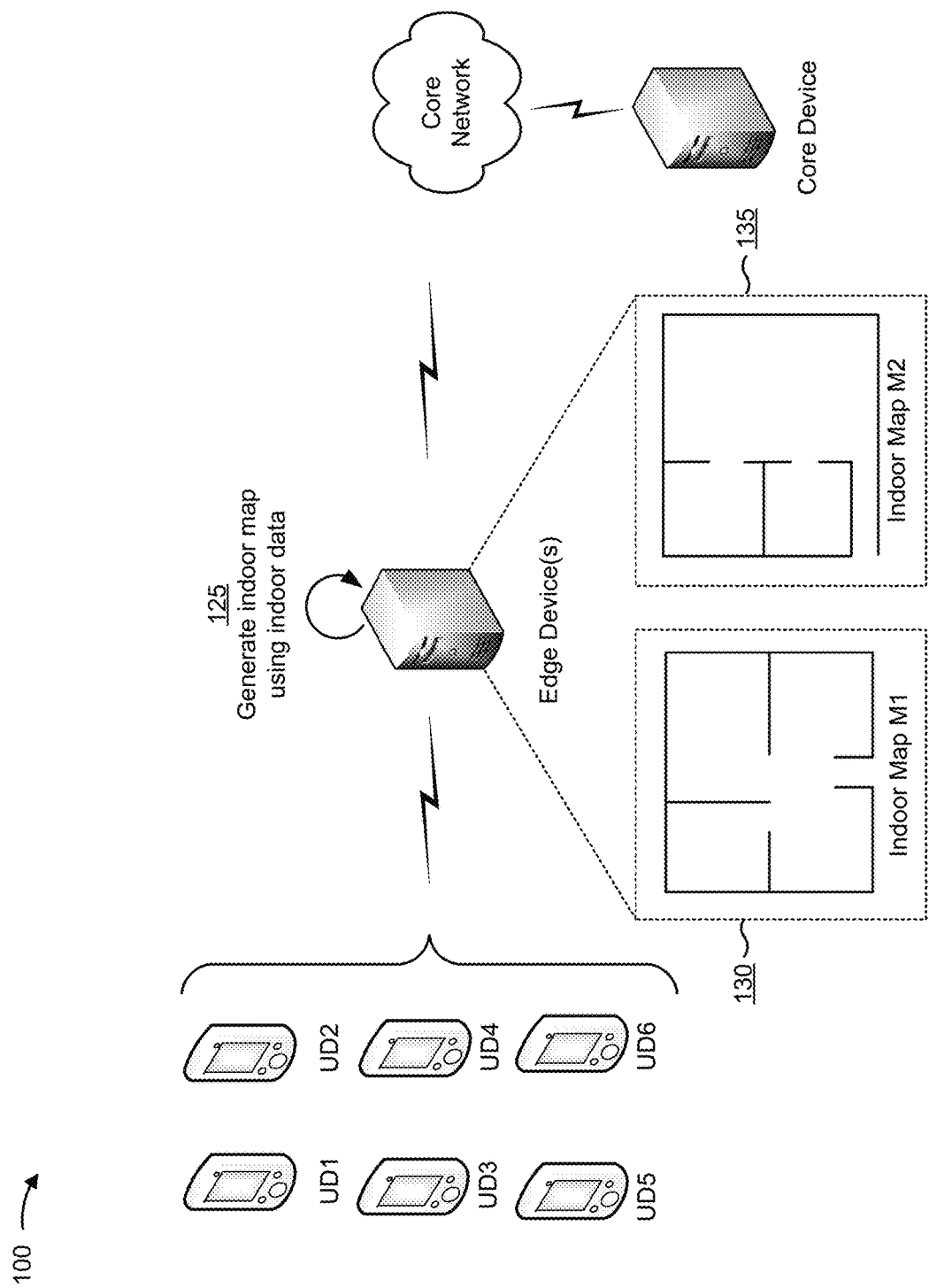

As shown in FIG. 1C, and by reference number 125, the edge device(s) may generate indoor maps for the buildings using the indoor data. As shown by reference number 130, the edge device(s) may generate indoor map M1 for building B1 using the indoor data from user devices UD1 and UD2. As shown by reference number 135, the edge device(s) may generate indoor map M2 for building B2 based on the indoor data from user devices UD3 and UD4.

Figure 1D:
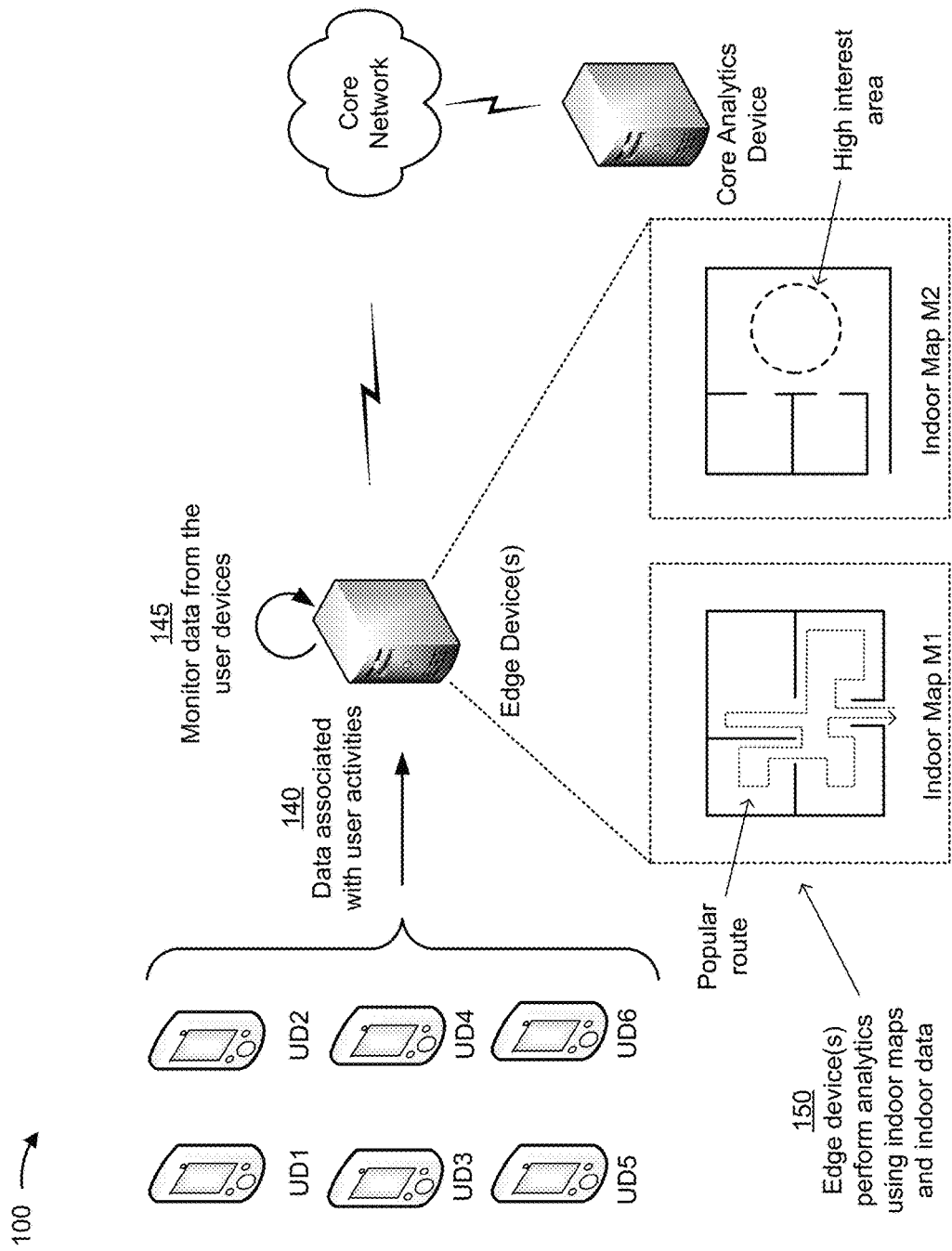

As shown in FIG. 1D, and by reference number 140, the edge device(s) may receive additional data from the user devices. For example, the edge device(s) may continue to receive data from the user devices as the users of the user devices move about. As shown by reference number 145, the edge device(s) may monitor the data from the user devices. For example, the edge device(s) may determine whether the data is indoor data or outdoor data, may associate the additional indoor data with indoor maps M1 or M2, and/or may update indoor maps M1 and/or M2 when the indoor data indicates a change in the indoor layout of buildings B1 and/or B2.

As shown by reference number 150, the edge device(s) may perform analytics using the indoor maps and the indoor data. For example, the edge device(s) may use the indoor data to identify popular routes inside building B1, such as a popular shopping route inside building B1, assuming building B1 is a retail store. As another example, the edge device(s) may use the indoor data to identify a high interest area in building B2, such as a popular shopping section of building B2, assuming building B2 is a retail store.

Figure 1E:
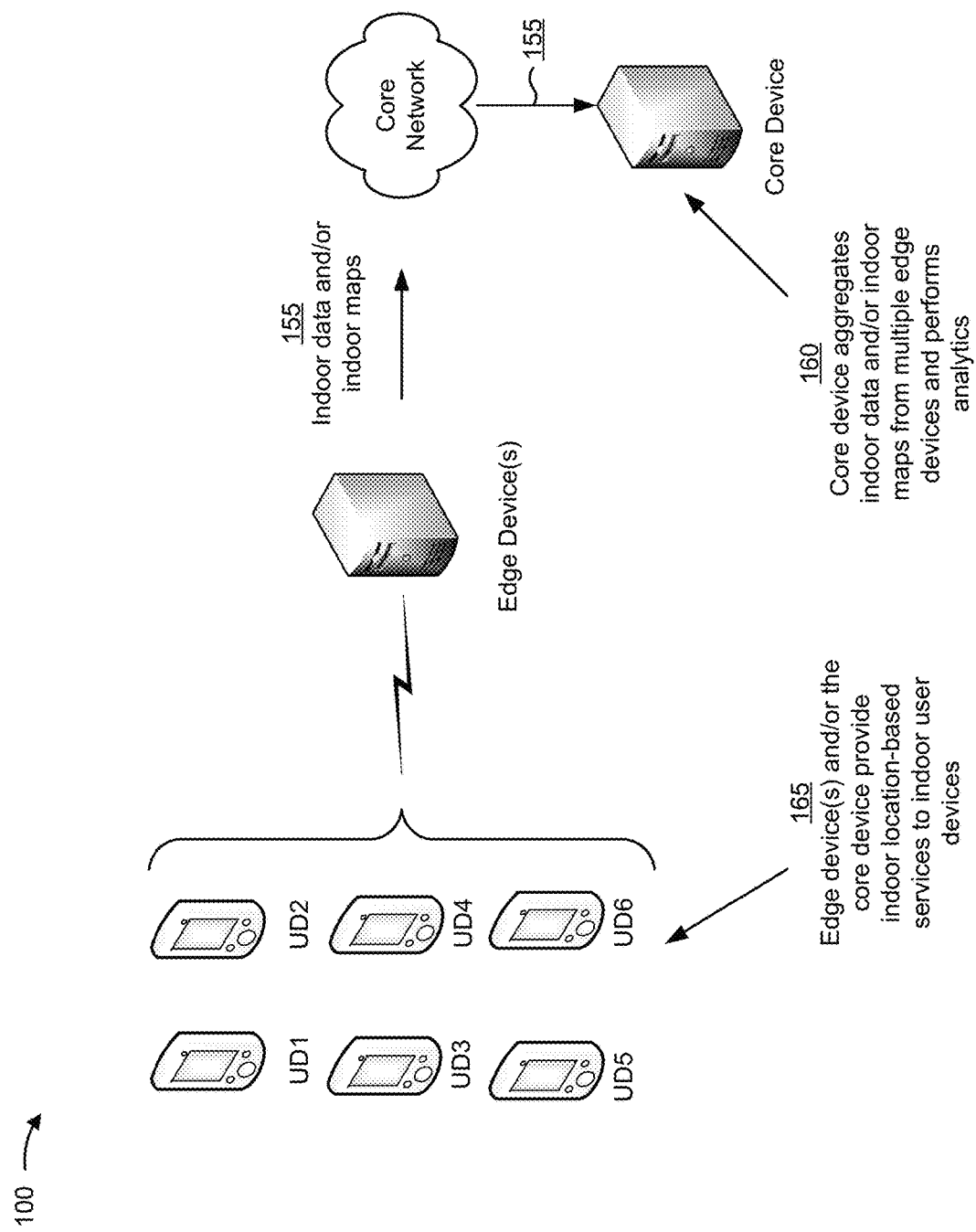

As shown in FIG. 1E, and by reference number 155, the edge device(s) may provide the indoor data and/or the indoor maps to a core device. For example, a first edge device may provide the indoor data, indoor map M1, and/or indoor map M2 to the core device for aggregation with other indoor data and/or other indoor maps from a second edge device. As shown by reference number 160, the core device may aggregate the indoor data and/or the indoor maps from multiple edge devices and may perform analytics using the aggregated indoor data and/or the aggregated indoor maps.

As shown by reference number 165, the edge device(s) and/or the core device may provide indoor location-based services to the indoor user devices using the indoor data and/or the indoor maps. For example, the edge device(s) may provide indoor map M1 to user device UD1 and UD2 for display and provide indoor map M2 to user devices UD3 and UD4 for display. As another example, the core device may provide user devices UD1 and UD2 with information about a popular route inside building B1 for display. As another example, the core device may provide user devices UD3 and UD4 with information about a high interest area inside building B2 for display. The edge device(s) and/or the core device may not provide indoor location-based services to user devices UD5 and UD6 based on user devices UD5 and UD6 being located outside buildings B1 and B2.

In this way, an edge device may generate an indoor map for a building using data from user devices located inside the building. Further, the edge device and/or a core device may provide indoor location-based services to the user devices based on the data and/or using the indoor map. This improves the providing of indoor location-based services to the user devices inside the building by reducing and/or eliminating the need for the edge device and/or the core device to use other infrastructure located inside the building, such as beacons, to provide the indoor location-based services.

As indicated above, FIGS. 1A-1E are provided merely as an example. Other examples are possible and may differ from what was described with regard to FIGS. 1A-1E.

Figure 2:
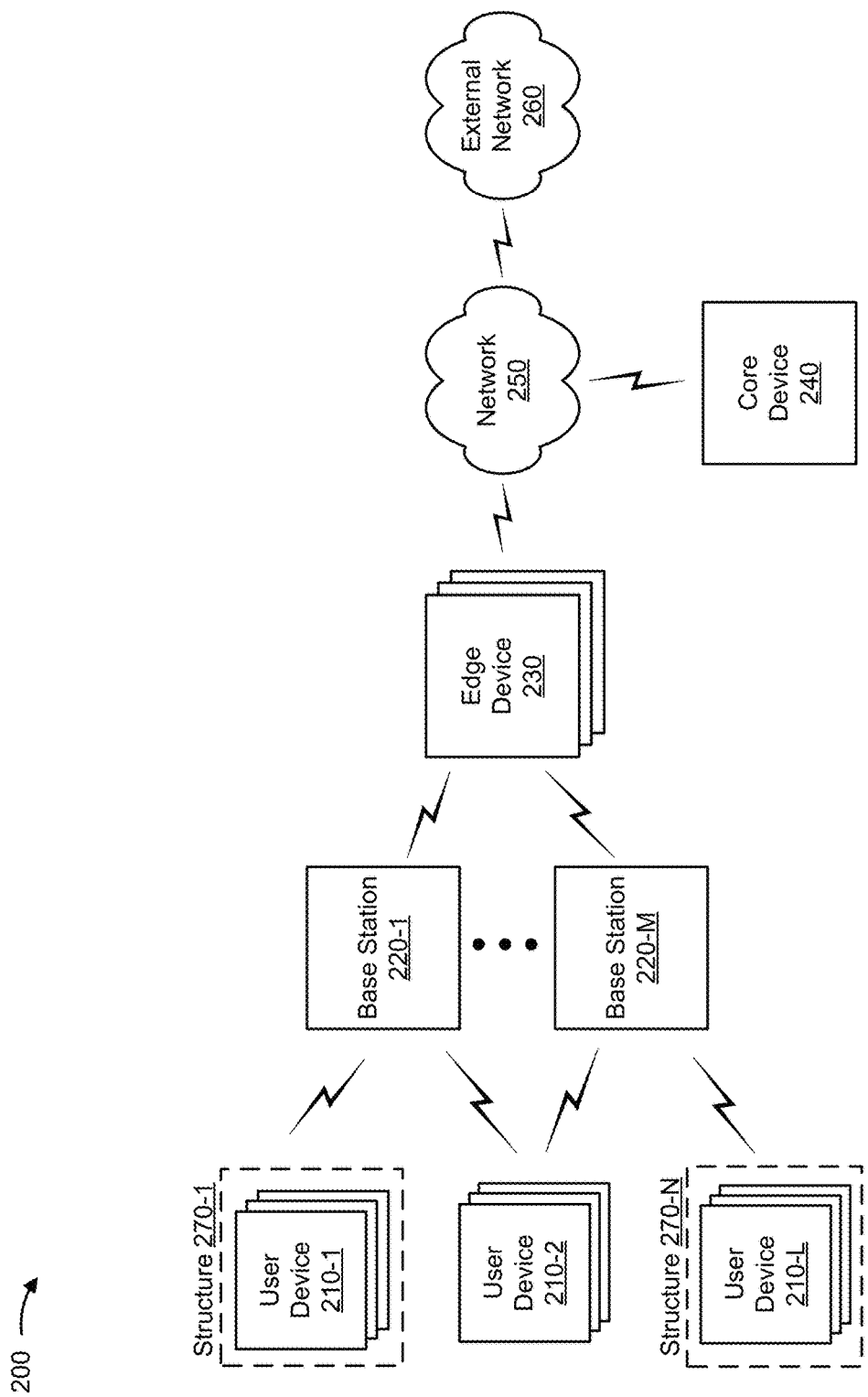
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-L (L≥1) (hereinafter referred to collectively as "user devices 210," and individually as "user device 210"), one or more base stations 220-1 through 220-M (M≥1) (hereinafter referred to collectively as "base stations 220," and individually as "base station 220"), one or more edge devices 230, a core device 240, a network 250, an external network 260, and one or more structures 270-1 through 270-N (N≥1) (hereinafter referred to collectively as "structures 270," and individually as "structure 270"). Devices of environment 200 may interconnect via wired connections, wireless connections, or a combination of wired and wireless connections.

User device 210 includes one or more devices capable of sensing and/or gathering data associated with an activity of a user of user device 210. For example, user device 210 may include a communication and/or computing device, such as a mobile phone (e.g., a smart phone or a radiotelephone), a laptop computer, a tablet computer, a gaming device, a wearable communication device (e.g., a smart wristwatch or a pair of smart eyeglasses), or a similar type of device. In some implementations, user device 210 may use one or more sensors associated with user device 210 to detect and/or gather data associated with an activity of the user, as described more fully elsewhere herein. In some implementations, user device 210 may provide the data to edge device 230 (e.g., via base station 220) to enable edge device 230 to generate an indoor map, as described more fully elsewhere herein.

Base station 220 includes one or more devices capable of transferring traffic, such as data and/or other traffic, destined for and/or received from user device 210. In some implementations, base station 220 may include an evolved Node B (eNB) associated with a long term evolution (LTE) network that receives traffic from and/or sends traffic to external network 260 via a serving gateway (SGW) and/or a packet data network gateway (PGW). Additionally, or alternatively, one or more base stations 220 may be associated with a radio access network (RAN) that is not associated with the LTE network. Base station 220 may send traffic to and/or receive traffic from user device 210 via an air interface. In some implementations, base station 220 may include a small cell base station, such as a base station of a microcell, a picocell, and/or a femtocell.

Edge device 230 includes one or more devices capable of receiving data from user device 210. For example, edge device 230 may include a server, a data center (e.g., a multi-server micro data center), a workstation computer, a virtual machine (VM) provided in a cloud computing environment, a router, a switch, a hub, a gateway, or a similar type of device. In some implementations, edge device 230 may aggregate data from one or more user devices 210 and may use the data to generate one or more indoor maps, as described in more detail elsewhere herein. Additionally, or alternatively, edge device 230 may provide the data received from the one or more user devices 210 to core device 240 for aggregation with data from one or more other edge device 230, as described in more detail elsewhere herein. In some implementations, edge device 230 may perform analytics or analysis on the data, as described in more detail elsewhere herein.

Core device 240 includes one or more devices capable of receiving data associated with one or more user device 210. For example, core device 240 may include a server, a workstation computer, a VM provided in a cloud computing environment, a router, a switch, a hub, a gateway, or a similar type of device. In some implementations, core device 240 may aggregate data received from one or more edge device 230 and may perform analytics or analysis on the data, as described in more detail elsewhere herein. Additionally, or alternatively, core device 240 may provide indoor location-based services to user device 210, as described in more detail elsewhere herein.

Network 250 includes one or more wired and/or wireless networks. For example, network 250 may include a public land mobile network (PLMN), a local area network (LAN), a wireless local area network (WLAN), such as a Wi-Fi network, a wide area network (WAN), a metropolitan area network (MAN), a telephone network (e.g., a Public Switched Telephone Network (PSTN)), a private network, an ad hoc network, an intranet, the Internet, a fiber optic-based network, a cloud computing network, and/or a combination of these or other types of networks. In some implementations, network 250 may include an evolved packet core (EPC) that operates based on a third generation partnership project (3GPP) wireless communication standard. Additionally, or alternatively, network 250 may include an Internet protocol (IP) multimedia subsystem (IMS) core. In some implementations, edge device 230 may communicate with core device 240 via network 250, as described in more detail elsewhere herein.

External network 260 includes one or more wired and/or wireless networks. For example, external network 260 may include a cellular network (e.g., an LTE network, a 3G network, and/or a code division multiple access (CDMA) network), a PLMN, a LAN, a WLAN, a WAN, a MAN, a telephone network (e.g., a PSTN), a private network, an ad hoc network, an intranet, the Internet, a fiber optic-based network, a cloud computing network, and/or a combination of these or other types of networks.

Structure 270 includes one or more physical structures. For example, structure 270 may include a building, such as a house, a retail store, an office building, an airport, or a stadium. In some implementations, a user of user device 210 may be inside structure 270 and moving about structure 270, as described in more detail elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
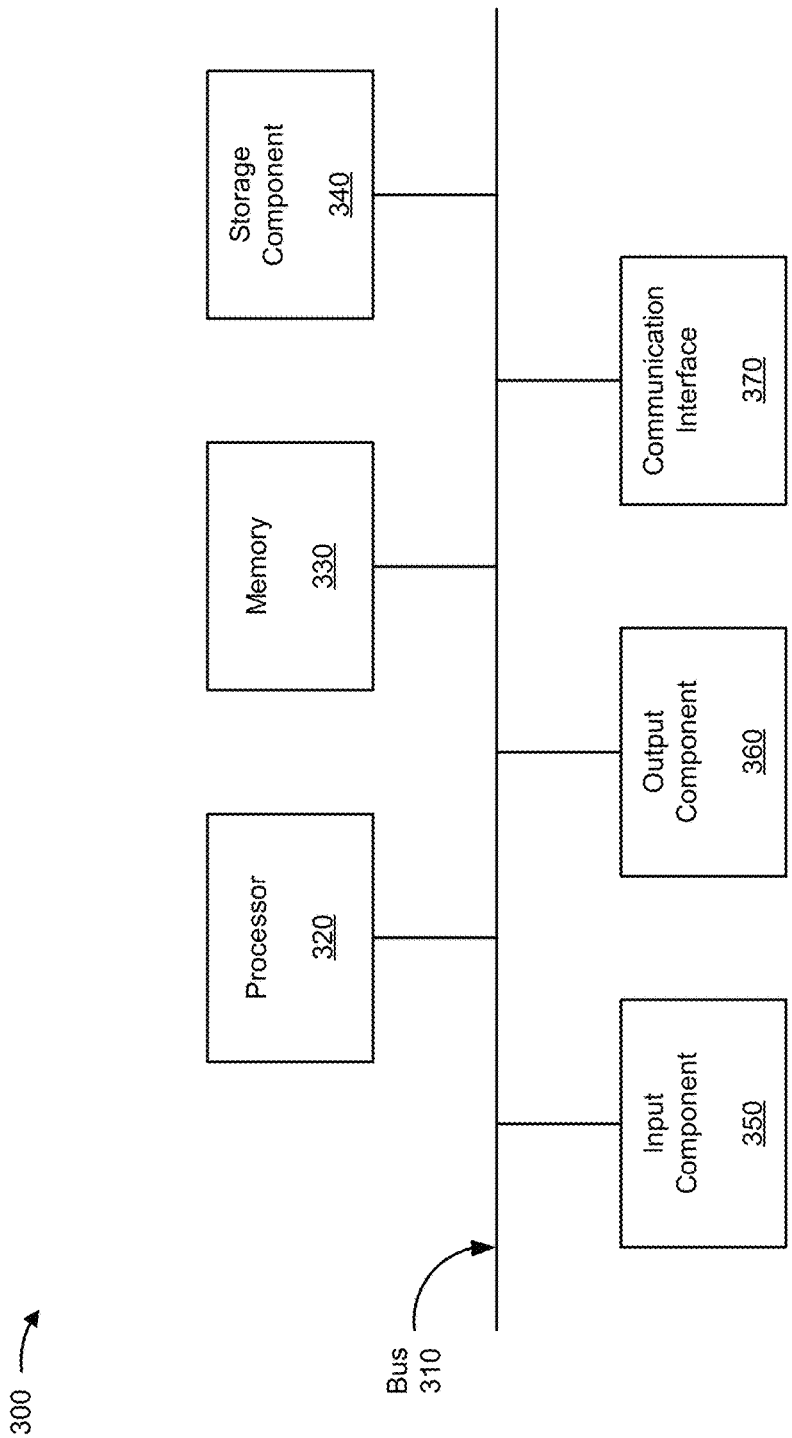
FIG. 3 is a diagram of example components of one or more devices of FIG. 2.

FIG. 3 is a diagram of example components of a device 300. Device 300 may correspond to user device 210, base station 220, edge device 230, and/or core device 240. In some implementations, user device 210, base station 220, edge device 230, and/or core device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
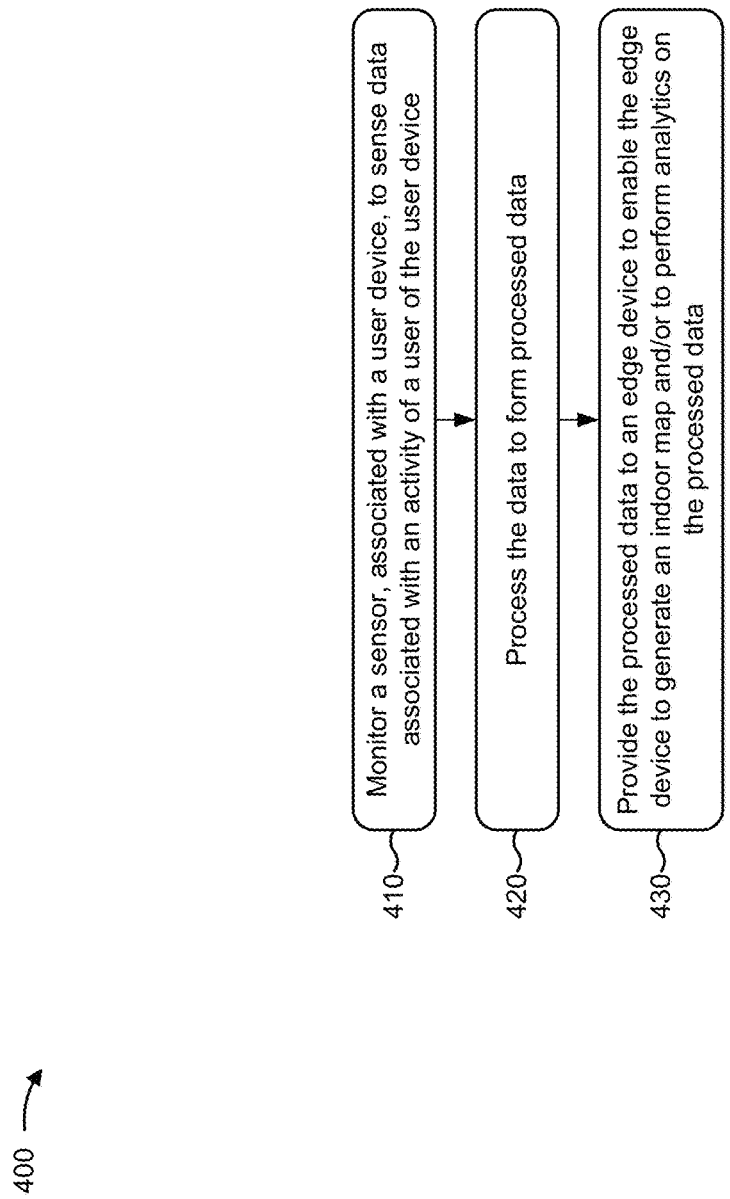
FIG. 4 is a flow chart of an example process for processing data sensed by a user device to form processed data.

FIG. 4 is a flow chart of an example process 400 for processing data sensed by a user device to form processed data. In some implementations, one or more process blocks of FIG. 4 may be performed by user device 210. In some implementations, one or more process blocks of FIG. 4 may be performed by another device or a group of devices separate from or including user device 210, such as base station 220, edge device 230 and/or core device 240.

As shown in FIG. 4, process 400 may include monitoring a sensor, associated with a user device, to sense data associated with an activity of a user of the user device (block 410). For example, user device 210 may monitor an accelerometer, a barometer, a GPS, a gyroscope, or a magnetometer. In some implementations, user device 210 may monitor the sensor to sense data associated with an activity of the user, such as walking, turning, changing levels in a building, riding in a vehicle, or remaining stationary.

In some implementations, user device 210 may use a device or application (e.g., an application installed on the user device, executing on the user device, or executed remotely by the user device) to gather the data sensed by the sensor. For example, user device 210 may use a collection controller to sense and/or gather the data. In some implementations, user device 210 may use the device or the application to manage the collection of data from the sensor, as described below.

In this way, user device 210 may monitor a sensor to sense data associated with an activity of a user of user device 210.

As further shown in FIG. 4, process 400 may include processing the data to form processed data (block 420). For example, user device 210 may process the data to sanitize the data (e.g., to remove personally identifiable information), to remove outlier data, to identify an activity of the user, and/or to manage interfacing with devices and/or applications that gather or process the data. In some implementations, user device 210 may use a device or application associated with user device 210, such as a local analytics engine, to process the data.

In some implementations, user device 210 may process the data to identify an activity of the user, such as steps, turns, directions of travel, distance traveled, and/or level changes. In some implementations, user device 210 may process the data to identify steps associated with the user of user device 210. For example, user device 210 may identify steps of the user when user device 210 gathers data from an accelerometer or a pedometer that indicates peak accelerations of the accelerometer or the pedometer.

In some implementations, user device 210 may process the data from the accelerometer or the pedometer using one or more techniques. For example, user device 210 may process the data using a low-pass filter, autocorrelation, dynamic time warping, hidden Markov chain, or short term Fourier transformation to reduce data interference and/or to recognize data patterns (e.g., to differentiate between accelerations resulting from user steps and accelerations resulting from other user movements). This increases an accuracy of identifying steps of the user by processing the data to remove outlier data, false positive data, or the like.

In some implementations, user device 210 may process the data to identify turns associated with the user of user device 210. For example, user device 210 may identify turns of the user by gathering data from the gyroscope that indicates a rotation of user device 210 about an axis (e.g., a vertical axis). In some implementations, user device 210 may correlate the data with data from another sensor to increase the accuracy of identifying turns of the user. For example, user device 210 may correlate the data from the gyroscope and data from the accelerometer to improve identification of turns of the user.

In some implementations, combining data from the gyroscope and data from the accelerometer enables user device 210 to distinguish between turns in different directions (e.g., turns in a left direction and turns in a right direction) based on identifying accelerations associated with different axes. Additionally, or alternatively, using the gyroscope in combination with the accelerometer to sense turns improves turn sensing over other techniques, such as using an electronic compass to sense turns, by reducing or eliminating inaccuracies due to ferromagnetic interference that may occur during the use of an electronic compass.

In some implementations, user device 210 may process the data to determine a direction of travel of the user of user device 210. For example, user device 210 may process data from a GPS, when a GPS signal is available, to determine the direction of travel of the user. As another example, user device 210 may process data from an electronic compass to determine the direction of travel of the user of user device 210. In some implementations, user device 210 may provide information indicating the direction of travel to edge device 230 to enable edge device to generate an indoor map, as described below.

In some implementations, user device 210 may process the data to determine a distance traveled by a user using user device 210. For example, user device 210 may process data from a GPS, when a GPS signal is available, to determine the distance traveled by the user using user device 210. As another example, user device 210 and/or a pedometer associated with user device 210 may process data indicating steps of the user to determine the distance traveled by the user (e.g., by multiplying a quantity of steps by an amount of distance per step). In some implementations, user device 210 may provide information indicating the distance traveled to edge device 230 to enable edge device 230 to generate an indoor map, as described below.

In some implementations, user device 210 may process the data to identify an altitude change of the user, such as when the user moves from a first level of a building to a second level of the building. For example, user device 210 may use a barometer to sense altitude changes of the user and may identify an altitude change by identifying data from the barometer that indicates a change in atmospheric pressure.

In some implementations, user device 210 may process the data from the barometer using one or more techniques. For example, user device 210 may process the data using a low-pass filter to improve the identification of altitude changes by removing outlier data or false positive data. As another example, user device 210 may process the data from the barometer using a sliding window algorithm, which may improve identification of altitude changes by enabling user device 210 to determine whether the data from the barometer indicates a consistent increase or a consistent decrease in atmospheric pressure, thereby indicating an altitude change of the user.

In some implementations, when processing the data to identify an altitude change of the user, user device 210 may combine data from one or more sensors to identify a level change of the user. For example, user device 210 may combine data from the barometer with data from the accelerometer or the pedometer to identify a user that is using a set of stairs (e.g., an altitude change and correlated accelerations) or to identify a user that is using an elevator or escalator (e.g., an altitude change and no correlated accelerations).

In this way, user device 210 may process the data to form processed data.

In some implementations, user device 210 may identify a state of the user based on the data gathered from the sensor. For example, the device or the application used to gather the data may include a state machine. In some implementations, user device 210 may use the state machine to identify the state of the user (e.g., persistent dwelling, transient dwelling, passive moving, active moving, etc.). For example, user device 210 may identify the state of the user as persistent dwelling, such as sitting in a fixed location, based on the data indicating a lack of movement by the user (e.g., a lack of steps or a lack of turns).

As another example, user device 210 may identify the state of the user as transient dwelling, such as browsing products in a store, based on the data indicating an amount of movement less than a threshold amount of movement (e.g., a rate of speed less than a threshold rate of speed or a quantity of steps or turns in a time period less than a threshold quantity of steps or turns in a time period).

As another example, user device 210 may identify the state of the user as passive moving, such as riding in a vehicle, based on the data indicating that the user is moving at a rate of speed higher than a threshold rate of speed with an amount of movement less than a threshold amount of movement. As another example, user device 210 may identify the state of the user as active moving, such as walking or running, based on the data indicating that the user is moving at a rate of speed greater than a threshold rate of speed and that an amount of movement of the user is more than a threshold amount of movement.

In some implementations, user device 210 may adjust the sensing and/or gathering of the data based on identifying the state of the user. For example, user device 210 may adjust whether or the frequency at which particular sensors sense and/or gather the data based on identifying the state of the user. In some implementations, user device 210 may adjust the sensing and/or collection of the data based on identifying the state of the user as persistent dwelling. For example, user device 210 may continue to sense and/or gather data using the accelerometer but may cease sensing and/or gathering data from the GPS, the gyroscope, the magnetometer, and/or the pedometer based on identifying the state of the user as persistent dwelling.

In some implementations, user device 210 may adjust the sensing and/or collection of the data based on identifying the state of the user as transient dwelling. For example, user device 210 may continue to sense and/or gather data using the accelerometer and the pedometer but may cease sensing and/or gathering data using the GPS, the gyroscope, and/or the pedometer based on identifying the state of the user as transient dwelling. In some implementations, user device 210 may adjust the sensing and/or collection of the data based on identifying the state of the user as passive moving.

For example, user device 210 may continue to sense and/or gather data from the GPS, may sense and/or gather data at a reduced frequency from the accelerometer and the magnetometer, and may cease sensing and/or gathering data from the gyroscope and the pedometer based on identifying the state of the user as passive moving.

In some implementations, user device 210 may adjust the sensing and/or collection of the data based on identifying the state of the user as active moving. For example, user device 210 may sense and/or gather data from the accelerometer, the barometer, the GPS, the gyroscope, the magnetometer, and the pedometer based on identifying the state of the user as active moving. In some implementations, user device 210 may sense and/or gather data from the sensors at an increased frequency based on identifying the state of the user as active moving (e.g., relative to a frequency of sensing and/or gathering associated other states).

In some implementations, user device 210 may adjust the sensing and/or collection of the data based on other parameters. For example, user device 210 may adjust the sensing and/or collection of the data using a timer. As another example, user device 210 may adjust the sensing and/or collection of the data based on a time of day or a day of the week. Adjusting the sensing and/or collection of the data based on a state of the user or on other parameters conserves processor resources of user device 210 by reducing or preventing sensing and/or collection of the data when the user of user device 210 is not actively moving.

As further shown in FIG. 4, process 400 may include providing the processed data to an edge device to enable the edge device to generate an indoor map and/or to perform analytics on the processed data (block 430). For example, a device or an application associated with user device 210 may provide the processed data to edge device 230. In some implementations, user device 210 may provide the processed data to edge device 230 to enable edge device 230 to generate one or more indoor maps based on the processed data and/or to perform analytics on the processed data.

In some implementations, user device 210 may determine whether to provide the processed data to edge device 230. For example, user device 210 may determine whether to provide the processed data to edge device 230 based on determining an impact of providing the processed data on network congestion, on consumption of network resources, or on power consumption of user device 210. As another example, user device 210 may determine whether to provide the processed data to edge device 230 based on whether the processed data is different from previously provided processed data, in which case user device 210 may provide an indication to edge device 230 that the data is unchanged (rather than providing the data to edge device 230).

This conserves network resources, computing resources of user device 210, and/or power resources of user device 210 by preventing user device 210 from providing the processed data, such as when providing the processed data would negatively impact network resources or would include providing unchanged processed data.

In some implementations, user device 210 may determine when to provide the processed data to edge device 230. For example, user device 210 may determine to provide the processed data according to a fixed frequency, when user device 210 processes a threshold quantity of data, when network congestion is less than a threshold amount of network congestion, based on a type of network connection with edge device 230 (e.g., user device 210 may provide the processed data when connected to a Wi-Fi network and not provide the processed data when connected to a cellular network), at a particular time of day or month, based on a status of user device 210 (e.g., active/idle or roaming/not roaming), or when user device 210 has adequate network connectivity to provide the processed data. This enables user device 210 to dynamically adjust when user device 210 provides the data to edge device 230, thereby conserving computing resources of user device 210.

In this way, user device 210 may provide the processed data to edge device 230.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
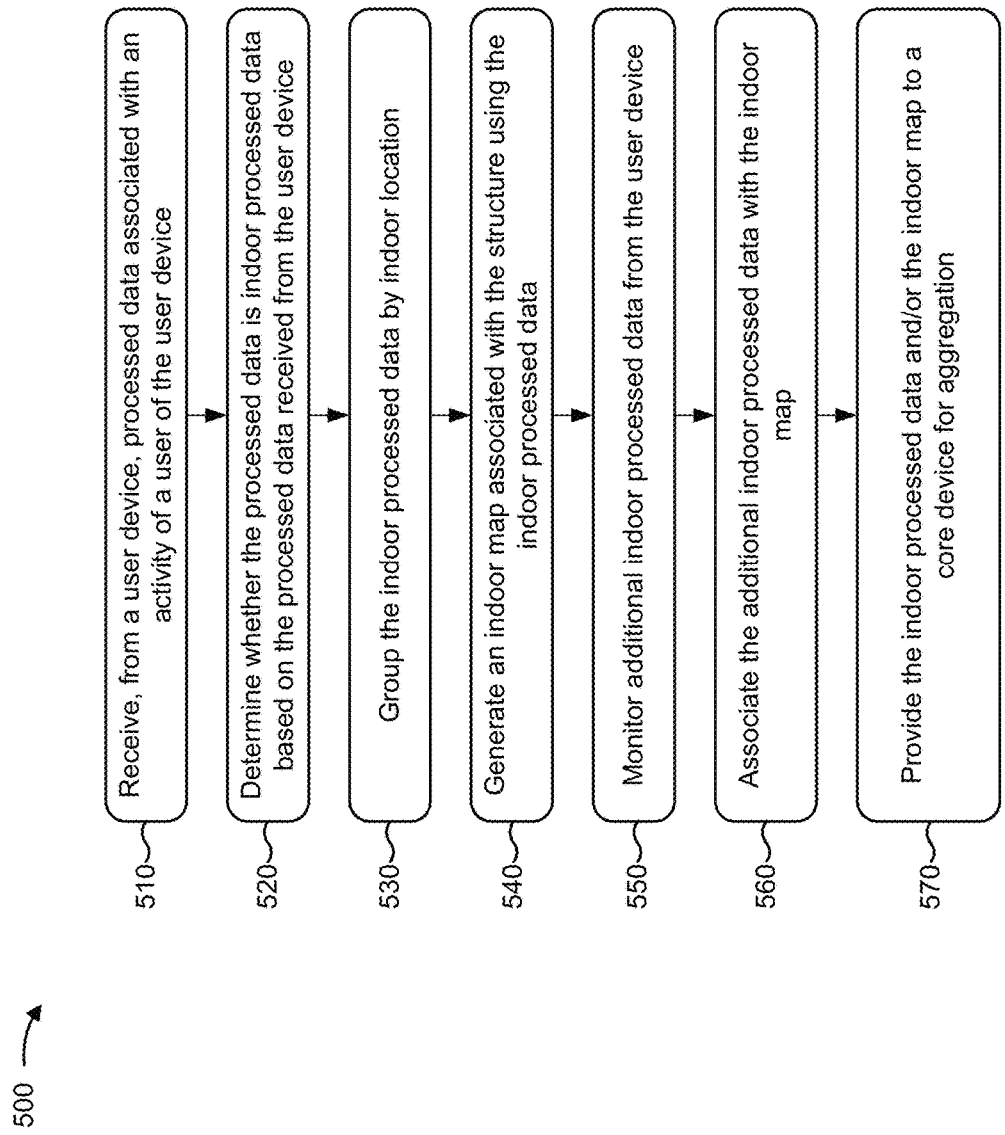
FIG. 5 is a flow chart of an example process for generating an indoor map for a structure using data gathered by a user device.

FIG. 5 is a flow chart of an example process 500 for generating an indoor map for a structure using data gathered by a user device. In some implementations, one or more process blocks of FIG. 5 may be performed by edge device 230. In some implementations, one or more process blocks of FIG. 5 may be performed by another device or a group of devices separate from or including edge device 230, such as user device 210, base station 220, and/or core device 240.

As shown in FIG. 5, process 500 may include receiving, from a user device, processed data associated with an activity of a user of the user device (block 510). For example, edge device 230 may receive the processed data from user device 210. In some implementations, the processed data may indicate an activity of the user of user device 210, such as steps, turns, directions of travel, distance traveled, and/or level changes. In some implementations, edge device 230 may receive data from user device 210 that is not processed and may process the data in a manner similar to that described with respect to FIG. 4 to form processed data.

As further shown in FIG. 5, process 500 may include determining whether the processed data is indoor processed data based on the processed data received from the user device (block 520). For example, edge device 230 may determine whether the processed data is associated with a user inside structure 270 or a user outside structure 270. In some implementations, determining whether the processed data is indoor processed data may enable edge device 230 to determine which processed data to use to generate an indoor map.

In some implementations, edge device 230 may determine whether the processed data is indoor processed data based on the processed data received from user device 210. For example, edge device 230 may identify indoor processed data based on a state of the user indicated by the processed data, where the passive moving state may indicate that the user is riding in a vehicle and not inside structure 270 or where the transient dwelling state may indicate that the user is browsing inside structure 270, such as in a retail store. As another example, edge device 230 may identify indoor processed data where the processed data indicates a change in cellular reception or GPS signal for user device 210, where a reduction in cellular reception or GPS reception for user device 210 may indicate that user device 210 has moved inside structure 270.

As another example, edge device 230 may identify indoor processed data based on user device 210 being in the same location as a known structure 270 (e.g., based on processed GPS data from user device 210 and/or geographical information that identifies the location of structures). As another example, edge device 230 may identify indoor processed data based on a presence and/or strength of signals from wireless access points (e.g., signals from a Wi-Fi router or a Bluetooth beacon), where the presence and/or strength of the signals may indicate that user device 210 is inside structure 270.

In some implementations, edge device 230 may discard or ignore processed data that edge device 230 determines is not indoor processed data (e.g., outdoor processed data from outdoor user devices 210). Additionally, or alternatively, edge device 230 may discard or ignore processed data where edge device 230 cannot determine whether the processed data is indoor processed data. This improves generation of the indoor map by preventing edge device 230 from using non-indoor processed data or processed data that edge device 230 cannot identify as indoor processed data to generate the indoor map.

In this way, edge device 230 may determine whether the processed data is indoor processed data.

As further shown in FIG. 5, process 500 may include grouping the indoor processed data by indoor location (block 530). For example, edge device 230 may identify a grouping of indoor processed data. In some implementations, edge device 230 may determine that the grouping of indoor processed data indicates that the indoor processed data is associated with a particular structure 270.

In some implementations, edge device 230 may identify the grouping of indoor processed data based on the indoor processed data. For example, edge device 230 may identify the grouping of indoor processed data based on the indoor processed data indicating a population density of user devices 210 (e.g., a population density greater than a threshold population density). As another example, edge device 230 may identify the grouping of indoor processed data based on the indoor processed data indicating that multiple user devices 210 are in the same location as a particular structure 270 (e.g., by using processed GPS data).

As another example, edge device 230 may identify the grouping of indoor processed data based on the indoor processed data indicating that multiple user devices 210 are within communicative proximity of the same wireless access point. In some implementations, edge device 230 may store information indicating an association between information indicating structure 270 and the indoor processed data based on identifying the grouping of indoor processed data.

In this way, edge device 230 may identify structure 270 associated with indoor processed data based on identifying a grouping of the indoor processed data.

As further shown in FIG. 5, process 500 may include generating an indoor map associated with the structure using the indoor processed data (block 540). For example, edge device 230 may generate the indoor map associated with the grouping of indoor processed data. In some implementations, edge device 230 may generate the indoor map based on the activities identified by the indoor processed data (e.g., steps, turns, directions of travel, distance traveled, and/or level changes), such as by overlaying the steps, turns, directions of travel, distance traveled, and/or level changes indicated by the indoor processed data for all user devices 210 inside structure 270.

In some implementations, edge device 230 may generate the indoor map based on the indoor processed data indicating steps of the user. For example, when the indoor processed data indicates steps of the user, edge device 230 may determine that the user in an open area such as a room or a hallway. In some implementations, edge device 230 may determine a size and/or boundaries of the open area, such as the length of a hallway or the length and width of a room based on a quantity of steps taken between turns of the user.

For example, assume that 0.76 meters equals one step. If edge device 230 determines, using the indoor processed data, that a user takes 20 steps in a particular direction, edge device 230 may determine that the area through which the user was walking is at least 15.2 meters in length or width.

In some implementations, edge device 230 may determine a type of the open area (e.g., room, hallway, or shopping isle) based on the indoor processed data. For example, edge device 230 may identify a hallway or a lobby based on the indoor processed data indicating that the steps of the user are longer than a threshold length or that the steps of the user are at a particular or consistent pace (e.g., one to two steps per time period). As another example, edge device 230 may identify a shopping isle or other confined space based on the indoor processed data indicating that the steps of the user are shorter than a threshold length or that the steps are at an inconsistent pace (e.g., two steps in a first time period followed by four steps in a second time period).

In some implementations, edge device 230 may generate the indoor map based on the indoor processed data indicating turns of the user. For example, when the indoor processed data indicates that the user has made a turn, edge device 230 may identify a turn in a hallway, an end of a shopping aisle, a boundary of a room (e.g., a wall), or a doorway. In some implementations, edge device 230 may generate the indoor map based on the indoor processed data indicating an altitude change of the user. For example, edge device 230 may determine that structure 270 includes a second level when the indoor processed data indicates an altitude change for user device 210.

In some implementations, edge device 230 may generate the indoor map based on combining indoor processed data that indicates different activities of the user. For example, edge device 230 may identify a first set of 30 steps followed by a right turn followed by a second set of 30 steps as a hallway with a first section that is 22.8 meters in length, a right turn, and a second section that is 22.8 meters in length. As another example, an altitude change with correlated steps and turns may indicate the presence of a staircase, such as a winding staircase. As another example, an altitude change without correlating steps or turns may indicate the presence of an elevator.

In some implementations, edge device 230 may combine indoor processed data from two or more user devices 210 to generate the indoor map. For example, edge device 230 may use first indoor processed data from a first user device 210 and a second user device 210 to generate the indoor map. This improves an accuracy of generating the indoor map by using multiple sources of indoor processed data to generate the indoor map.

In some implementations, edge device 230 may further process the indoor processed data in association with generating the indoor map. For example, edge device 230 may further process the indoor processed data to further remove outliers or other indoor processed data that may reduce the accuracy of generating the indoor map.

In some implementations, edge device 230 may further process indoor processed data that indicates steps of the user to reduce variance associated with the indoor processed data. For example, edge device 230 may determine a variance associated with a step frequency or a step acceleration indicated by the indoor processed data. In some implementations, edge device 230 may determine whether the variance is less than a threshold amount of variance.

In some implementations, when edge device 230 determines that the variance is less than the threshold amount of variance, edge device 230 may compare the indoor processed data to other indoor processed data (e.g., a set of reference indoor processed data) gathered from user devices 210 in the same structure 270 to check the indoor processed data for consistency with the other indoor processed data. For example, edge device 230 may determine an amount by which the indoor processed data differs from the other indoor processed data. In some implementations, where the indoor processed data is consistent with the other indoor processed data (e.g., differs by less than a threshold amount), edge device 230 may update the indoor map using the indoor processed data and/or add the indoor processed data to the set of reference indoor processed data.

In some implementations, when edge device 230 determines that the variance is not less than the threshold amount of variance, edge device 230 may ignore the indoor processed data and/or further process the indoor processed data to reduce the variance associated with the indoor processed data. Additionally, or alternatively, when edge device 230 determines that the indoor processed data is not consistent with the set of reference indoor processed data (e.g., differs by more than a threshold amount), edge device 230 may ignore the indoor processed data and/or further process the indoor processed data to reduce the variance associated with the indoor processed data.

In some implementations, edge device 230 may further process indoor processed data that indicates turns of the user. For example, edge device 230 may further process the indoor processed data to identify irregular turns (e.g., multiple turns about multiple axes within a threshold amount of time or turns at irregular angles, such as angles greater than or less than a threshold angle). In some implementations, when edge device 230 senses irregular turns, edge device 230 may compare the indoor processed data to the set of reference indoor processed data to determine whether to use indoor processed data to generate the indoor map.

In this way, edge device 230 may generate an indoor map for structure 270 using indoor processed data.

As further shown in FIG. 5, process 500 may include monitoring additional indoor processed data from the user device (block 550) and associating the additional indoor processed data with the indoor map (block 560). For example, edge device 230 may continue to receive indoor processed data from user device 210 after edge device 230 has generated the indoor map. In some implementations, edge device 230 may use the indoor processed data to monitor indoor routes, dwelling patterns, and/or other behaviors of users inside structure 270 by associating the indoor processed data with the indoor map of structure 270.

In some implementations, edge device 230 may monitor the indoor processed data to detect changes to an indoor layout of structure 270. For example, edge device 230 may monitor the indoor processed data to detect changes to an arrangement of shopping aisles in a retail store. In some implementations, edge device 230 may detect the changes to the indoor layout of structure 270 by comparing indoor processed data to a set of reference indoor processed data associated with structure 270 and identifying differences between the indoor processed data and the set of reference indoor processed data.

In some implementations, edge device 230 may update the indoor map based on detecting the changes to the indoor layout of structure 270. In some implementations, edge device 230 may wait to update the indoor map until edge device 230 detects similar changes to the indoor layout in a threshold amount of indoor processed data. This improves the manner in which edge device 230 updates the indoor map by enabling edge device 230 to determine whether differences between indoor processed data and a set of reference processed data for structure 270 represent actual changes, permanent changes, or temporary changes to the indoor layout of structure 270 prior to updating the indoor map.

In some implementations, monitoring the indoor processed data may enable edge device 230 to perform analytics on the indoor processed data. For example, edge device 230 may use the indoor processed data and the indoor map to determine popular routes inside structure 270 (e.g., popular shopping routes or areas of high foot traffic). As another example, edge device 230 may use the indoor processed data and the indoor map to determine areas of high interest inside structure 270 (e.g., popular rooms or popular shopping aisles). As another example, edge device 230 may use the indoor processed data and the indoor map to determine other patterns of usage of structure 270, such as a usage of structure 270 by time of day or day of the week.

In some implementations, edge device 230 may combine the indoor processed data with other data. For example, edge device 230 may combine indoor processed data with anonymized purchasing data to determine a dwelling-to-purchasing conversion ratio of shoppers in a retail store or a purchasing rate of items along a popular shopping route inside structure 270. This enables edge device 230 to perform analytics on data from multiple sources.

In some implementations, when edge device 230 performs analytics, edge device 230 may perform local or regional analytics (e.g., rather than enterprise-wide or global analytics). For example, edge device 230 may be associated with a region that includes one or more structures 270 that are geographically proximate. In this case, edge device 230 may monitor indoor processed data for structures 270 in the region and may not monitor indoor processed data for structures 270 in a different region.

In some implementations, edge device 230 may provide a service to user device 210 based monitoring the indoor processed data. For example, edge device 230 may provide indoor location-based services to user device 210, such as providing the indoor map of structure 270 for display via user device 210, providing directions to particular locations or retail items inside structure 270 for display via user device 210, or providing information associated with popular retail items or popular routes inside structure 270 for display via user device 210.

In this way, edge device 230 may monitor indoor processed data from user device 210 and may perform analytics using the indoor processed data.

As further shown in FIG. 5, process 500 may include providing the indoor processed data and/or the indoor map to a core device for aggregation (block 570). For example, edge device 230 may provide the indoor processed data, the indoor map, and/or metadata associated with the indoor processed data and/or the indoor map to core device 240. In some implementations, core device 240 may aggregate the indoor processed data and/or the indoor map with other indoor processed data and/or other indoor maps from one or more other edge devices 230.

In some implementations, core device 240 may perform analytics on the aggregated indoor processed data and/or the aggregated indoor maps. For example, core device 240 may perform analytics similar to those described above with respect to blocks 550 and 560, but may perform the analytics at an enterprise-wide, cross-regional, or global scale (e.g., rather than at a regional or local scale as was the case with analytics performed by edge device 230). In some implementations, core device 240 may provide a result of the analytics to another device and/or application (e.g., via an application programming interface (API)). This may enable a service provider to analyze and/or compare indoor processed data and/or indoor maps across multiple structures 270, multiple regions, or multiple edge devices 230.

In this way, edge device 230 may provide indoor processed data and/or an indoor map to core device 240 for aggregation with other indoor processed data and/or other indoor maps.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 400 may be performed in parallel.

Implementations described herein enable an edge device to generate an indoor map for a structure based on data gathered by a user device inside the structure. Additionally, the edge device and/or a core device may provide indoor location-based services to the user device inside the structure based on the data and/or the indoor map. This improves the providing of indoor location-based services by reducing or eliminating the need for other infrastructure, such as beacons, to provide indoor location-based services.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more processors to:
      receive data associated with an activity of a user,
         the data being received from one or more sensors associated with the user,
            the one or more sensors including at least one of:
               an accelerometer,
               a barometer,
               a global positioning system (GPS),
               a gyroscope,
               a magnetometer, or
               a pedometer;
      determine an activity state of the user based on the data associated with the activity of the user,
         the activity state of the user including:
            a passive moving state,
            an active moving state,
            a persistent dwelling state, or
            a transient dwelling state,
      determine whether the device is an indoor device or an outdoor device based on the data associated with the activity of the user and the activity state of the user;
      discard the data associated with the activity of the user when the activity state is the passive moving state;
      generate an indoor map associated with an indoor location using the data associated with the activity of the user based on determining that the device is the indoor device; and
      provide the indoor map for display.

2. The device of claim 1, where the one or more processors, when generating the indoor map, are to:
   identify a size of the indoor location by identifying steps of the user;
   identify boundaries of the indoor location by identifying turns of the user; and
   identify multiple levels of the indoor location by identifying altitude changes of the user.

3. The device of claim 1, where the activity of the user includes at least one of:
   a step of the user,
   a turn of the user,
   a direction of travel of the user,
   a distance traveled of the user, or
   an altitude change of the user.

4. The device of claim 1, where the one or more processors, when generating the indoor map, are to:
   selectively discard the data, received from the one or more sensors, based on the activity state of the user; and
   generate the indoor map using data not discarded.

5. The device of claim 1, where the one or more processors are further to:
   determine a first activity state of the user based on a first activity of the user;
   receive additional data from the one or more sensors;
   identify a second activity of the user based on the additional data; and
   determine a second activity state of the user based on the second activity of the user.

6. A non-transitory computer-readable medium storing instructions, the instructions comprising:
   one or more instructions that, when executed by one or more processors, cause the one or more processors to:
      receive data associated with an activity of a user of a user device,
         the data relating to at least one of:
            a step of the user,
            a turn of the user, or
            an altitude change of the user,
               the data being received from one or more sensors associated with the user,
               the one or more sensors including at least one of:
                  an accelerometer,
                  a barometer,
                  a global positioning system (GPS),
                  a gyroscope,
                  a magnetometer, or
                  a pedometer;
      determine an activity state of the user based on the data associated with the activity of the user,
         the activity state of the user including:
            a passive moving state,
            an active moving state,
            a persistent dwelling state, or
            a transient dwelling state,
      determine that the user is located inside a structure based on the data associated with the activity of the user and the activity state of the user;
      discard the data associated with the activity of the user when the activity state is the passive moving state;
      generate an indoor map for the structure using the data; and
      provide the indoor map for display in association with generating the indoor map.

7. The non-transitory computer-readable medium of claim 6, where the one or more instructions, that cause the one or more processors to determine the activity state of the user, cause the one or more processors to:
   determine a first activity state of the user based on a first activity of the user;
   receive additional data from the one or more sensors;
   identify a second activity of the user based on the additional data; and
   determine a second activity state of the user based on the second activity of the user.

8. The non-transitory computer-readable medium of claim 6, where the one or more instructions, that cause the one or more processors to generate the indoor map, cause the one or more processors to:
   selectively discard the data, received from the one or more sensors, based on the activity state of the user; and
   generate the indoor map using data not discarded.

9. The non-transitory computer-readable medium of claim 6, where the one or more instructions, when executed by the one or more processors, further cause the one or more processors to:
  receive additional data from the one or more sensors; and
  update the indoor map based on the additional data.

10. The non-transitory computer-readable medium of claim 6, where the one or more instructions, when executed by the one or more processors, further cause the one or more processors to:
  provide metadata associated with the data or the indoor map toward an edge device or a core device,
    the edge device or the core device aggregating the data or the indoor map.

11. The non-transitory computer-readable medium of claim 6, where the one or more instructions, that cause the one or processors to generate the indoor map, cause the one or more processors to:
  identify a size of the structure by identifying steps of the user;
  identify boundaries of the structure by identifying turns of the user; and
  identify multiple levels of the structure by identifying altitude changes of the user.

12. The non-transitory computer-readable medium of claim 6, where the activity of the user includes at least one of:
  a direction of travel of the user, or
  a distance traveled of the user.

13. A method, comprising:
  receiving, by a first device, data from one or more sensors associated with the first device,
    the one or more sensors including at least one of:
      an accelerometer,
      a barometer,
      a global positioning system (GPS),
      a gyroscope,
      a magnetometer, or
      a pedometer;
    the data indicating movements of the first device, and
    the first device being associated with a user;
  determining, by the first device, an activity state of the user indicated by the movements of the first device,
    the activity state of the user including:
      a passive moving state,
      an active moving state,
      a persistent dwelling state, or
      a transient dwelling state;
  determining, by the first device, whether the user is inside one or more structures based on the data and the activity state of the user;
  discarding, by the first device, the data from the one or more sensors when the activity state is the passive moving state;
  generating, by the first device, a map for a structure, of the one or more structures, by combining the data received from the one or more sensors; and
  providing, by the first device, the map for the structure for display and the data toward one or more second devices.

14. The method of claim 13, further comprising at least one of:
  identifying one or more steps of the user,
  identifying one or more turns of the user, or
  identifying one or more altitude changes of the user.

15. The method of claim 13, further comprising:
  receiving additional data from the one or more sensors;
  detecting a change in an indoor layout of the structure using the additional data; and
  updating the map based on the change in the indoor layout of the structure.

16. The method of claim 13, further comprising:
  receiving indoor location-based services from the one or more second devices based on the data and the map.

17. The method of claim 13, where the first device is a user device.

18. The method of claim 13, where the one or more second devices are edge devices or core devices.

19. The method of claim 13, where generating the map comprises:
  identifying a size of the structure by identifying steps of the user;
  identifying boundaries of the structure by identifying turns of the user; and
  identifying multiple levels of the structure by identifying altitude changes of the user.

20. The method of claim 13, where the movements of the first device include at least one of:
  a step of the user,
  a turn of the user,
  a direction of travel of the user,
  a distance traveled of the user, or
  an altitude change of the user.

* * * * *